United States Patent
Beaudin et al.

(10) Patent No.: US 11,543,510 B2
(45) Date of Patent: Jan. 3, 2023

(54) DYNAMIC RADAR DETECTION THRESHOLD FOR STATEFUL DYNAMIC FREQUENCY SELECTION

(71) Applicant: Hewlett Packard Enterprise Development LP, Houston, TX (US)

(72) Inventors: Andre Beaudin, Montreal (CA); Jean-Francois Gagnon, Dorval (CA); Mathieu Mercier, Laval (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 235 days.

(21) Appl. No.: 16/890,096

(22) Filed: Jun. 2, 2020

(65) Prior Publication Data
US 2021/0373143 A1 Dec. 2, 2021

(51) Int. Cl.
G01S 13/02 (2006.01)
G01S 7/292 (2006.01)
G01S 7/02 (2006.01)

(52) U.S. Cl.
CPC .......... G01S 13/0218 (2013.01); G01S 7/021 (2013.01); G01S 7/2927 (2013.01)

(58) Field of Classification Search
CPC ..... G01S 13/0218; G01S 7/021; G01S 7/2927
See application file for complete search history.

(56) References Cited

U.S. PATENT DOCUMENTS 9,807,619 B2 * 10/2017 Tsai ................... G01S 7/021
10,254,386 B1 * 4/2019 Beaudin ............. G01S 7/021
10,948,568 B1 * 3/2021 Chen .................. H04W 24/02
2015/0063321 A1 * 3/2015 Sadek ............. H04W 72/0446
  370/336
2017/0041954 A1 * 2/2017 Tsai .................... G01S 7/021
2018/0332583 A1 * 11/2018 Shah .................. H04W 16/14
2019/0342795 A1 * 11/2019 McFarland .......... H04W 28/18
2019/0364598 A1 * 11/2019 Ringland ............ H04W 16/14
2020/0296659 A1 * 9/2020 Kunjar ................ H04W 48/14
2021/0160198 A1 * 5/2021 Kulkarni ............... H04L 63/20

OTHER PUBLICATIONS

"Compliance Measurement Procedures for Unlicensed—National Information Infrastructure Devices Operating in The 5250-5350 MHz AND 5470-5725 MHz Bands Incorporating Dynamic Frequency Selection", Federal Communications Commission Office of Engineering and Technology Laboratory Division, UNII DFS Compliance Procedures New Rules v02, Apr. 8, 2016, pp. 1-49.

* cited by examiner

*Primary Examiner* — Timothy X Pham
(74) *Attorney, Agent, or Firm* — Jaffery Watson Mendonsa & Hamilton

(57) ABSTRACT

Embodiments are directed to a dynamic radar detection threshold for stateful dynamic frequency selection (DFS). An embodiment of a storage medium includes instructions to operations including estimate a duty time of transmission of wireless signals by an access point, the access point to provide Wi-Fi communication, the wireless signals being communicated on a DFS channel of the access point, adapt, based at least in part on the duty time of transmission, a threshold of radar signals to indicate detection of a radar signal at the access point on the DFS channel, and perform analysis of received wireless signals on the DFS channel at the access point to detect the radar signal using the adapted threshold of radar signals.

20 Claims, 6 Drawing Sheets

300

```
┌─────────────────────────────────────────────────────────┐
│ Estimate a duty time of transmission of wireless signals by an │
│ access point, the wireless signals communicated on a Dynamic │
│ Frequency Selection (DFS) channel of the access point   │
│                                                     310 │
└─────────────────────────────────────────────────────────┘
                             │
                             ▼
┌─────────────────────────────────────────────────────────┐
│ Adapt, based at least in part on the duty time of transmission, a │
│ threshold of radar signals to indicate detection of a radar signal │
│ at the access point on the DFS channel                  │
│                                                     320 │
└─────────────────────────────────────────────────────────┘
                             │
                             ▼
┌─────────────────────────────────────────────────────────┐
│ Perform analysis of received wireless signals on the DFS │
│ channel at the access point to detect the radar signal using the │
│ adapted threshold of radar signals                      │
│                                                     330 │
└─────────────────────────────────────────────────────────┘
                             │
                             ▼
┌─────────────────────────────────────────────────────────┐
│ Stop transmission and select a new channel on the AP in │
│ response to detecting the radar signal                  │
│                                                     340 │
└─────────────────────────────────────────────────────────┘
```

FIG. 3

DYNAMIC RADAR DETECTION THRESHOLD FOR STATEFUL DYNAMIC FREQUENCY SELECTION

BACKGROUND

In computer networking, a wireless Access Point (AP) is a networking hardware device that allows a Wi-Fi compliant client device to connect to a wired network and to communicate with other client devices directly over Wi-Fi. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller.

Dynamic Frequency Selection (DFS) may be applied in Wi-Fi networks. DFS is a mechanism that allows wireless devices (e.g., stations (STAs)) to use 5 GHz frequency bands or channels without causing interference to radar systems or other services that are allocated in those channels. Using DFS, the AP(s) in the Wi-Fi network can automatically select frequency channels with low interference levels. DFS is mandated in the 5 GHz band for purposes of radar avoidance. Regulatory requirements limit the number of frequency channels (e.g., 5 GHz channels) that are available or place additional restrictions on their use because this spectrum is shared with other technologies or services. Wi-Fi networks operating in those bands should employ a radar detection and avoidance capability. In the context of Wi-Fi, an AP that supports DFS should be able to detect radar signals during the channel start-up and in-service. If radar signals are detected, the AP stops transmitting and then selects a new channel.

BRIEF DESCRIPTION OF THE DRAWINGS

Embodiments described here are illustrated by way of example, and not by way of limitation, in the figures of the accompanying drawings in which like reference numerals refer to similar elements.

FIG. 3 illustrates operations for dynamic radar detection threshold for stateful DFS according to some embodiments;

DETAILED DESCRIPTION

Figure 1:
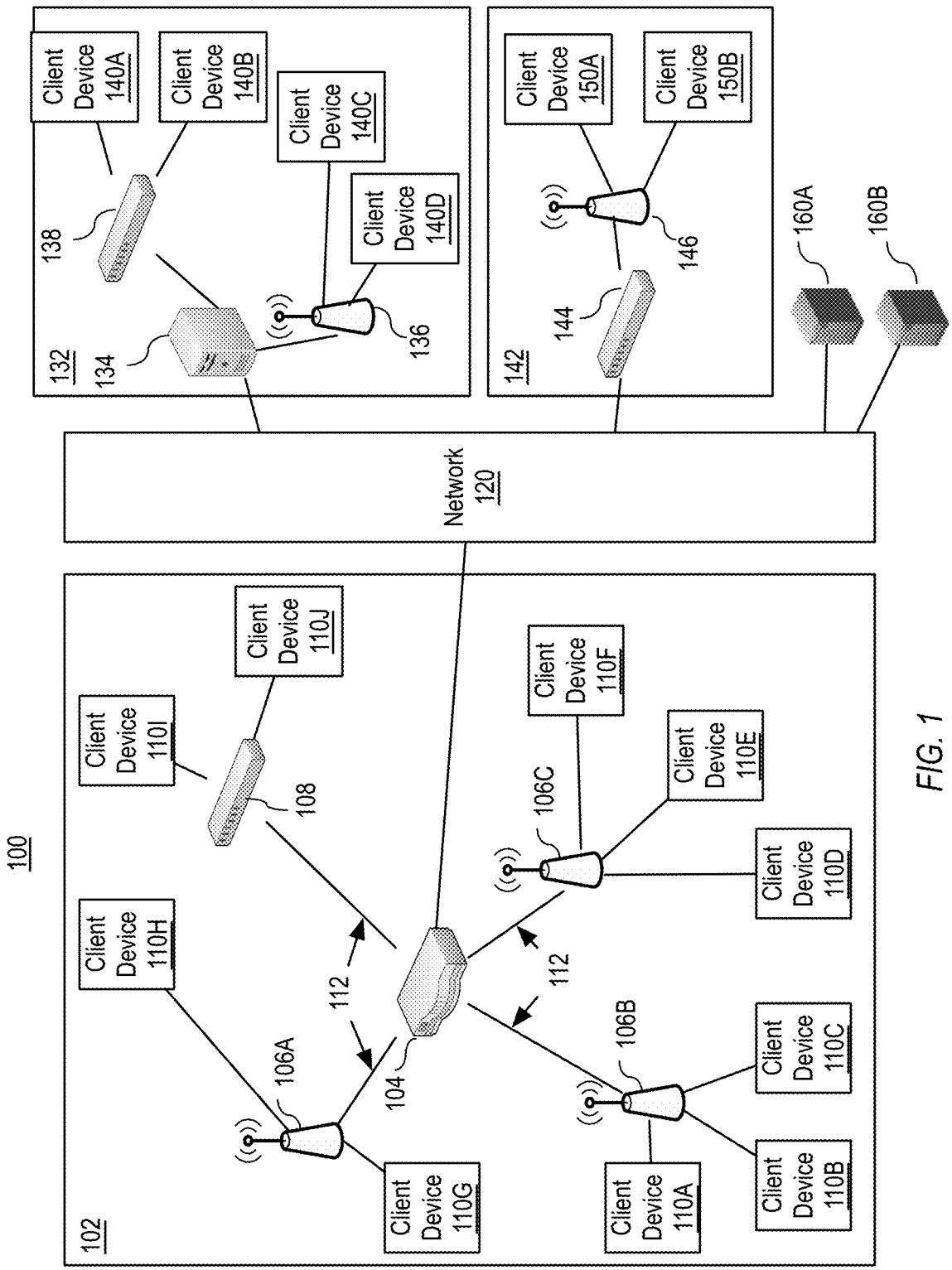
FIG. 1 illustrates a network configuration for dynamic radar detection threshold for stateful dynamic frequency selection (DFS) according to some embodiments.

Embodiments described herein are directed to a dynamic radar detection threshold for stateful dynamic frequency selection (DFS).

DFS is a spectrum-sharing mechanism that allows Wi-Fi access points (APs) to coexist with radar systems in the 5 GHz band. When operating on a channel with DFS in place, an AP should detect radar systems operating at the same frequency and change to a different channel when such radar systems are detected. When a radar system is operating on a Wi-Fi channel, the radar system causes a series of radio frequency (RF) pulses that the Wi-Fi radio chipset reports to the AP driver. The AP driver can then identify the radar based on the known patterns of the radar systems.

In implementations of the disclosed technology, a system or process is to provide for dynamic radar detection threshold for stateful DFS. In some embodiments, the system or process dynamically adjusts a threshold that is used for detection of radar systems when AP is operating on a channel with DFS rules. When a radar is operating on a DFS channel, the radar causes a series of radio frequency (RF) bursts and/or pulses that the AP chipset reports to the AP driver. The AP driver code then identifies the radar based on known patterns of the radar systems. If radar signals are detected, the AP should stop transmitting on the current DFS channel and then select a new channel.

Conventionally, the AP driver is configured with a threshold of RF pulses or bursts that, if detected, would identify a particular radar. This configured threshold of RF pulses or bursts remains static in the driver configuration, without regard to a transmit load of the AP on the DFS channel. Such static configuration of the threshold without regard to transmit load, often results in false radar detection events and degraded customer experience with respect to the AP.

Implementations of the disclosure propose dynamically adjusting a threshold level of (e.g., minimum number) of radar bursts and/or pulses (depending on long form or short form radar waveform) entailed for the classification of radar in the AP. Depending on a mode of the AP, implementations of the disclosure can estimate the duty of time of transmission of the AP and adapt the threshold in a dynamic fashion. The modes of the AP may include, but are not limited to, channel availability check (CAC) mode, in-service monitoring (ISM) mode, Zero Wait DFS (ZDFS) mode, and Zero Transmit (ZTX) mode.

In one example, in CAC/ZDFS modes of the AP, as there is no transmission occurring on the AP, so all radar pulses/bursts are expected to be present, and thus the threshold configuration of radar pulses/bursts can be adjusted higher via the dynamic threshold. In another example, transmitting beacons with no clients results in a smaller number of radar bursts and/or pulses than normal, and thus the threshold configuration of number of radar pulses/bursts can be adjusted higher via the dynamic threshold, but perhaps not as high as the CAC/ZDFS mode. Heavy AP usage expects only a small amount of radar pulses/burst to be detected, and thus the threshold configuration of minimum number of radar bursts can be adjusted lower via the dynamic threshold.

Implementations of the disclosure operate by estimating a duty time of transmission of wireless signals by an access point, the access point to provide Wi-Fi communication, the wireless signals being communicated on a Dynamic Frequency Selection (DFS) channel of the access point; adapting, based at least in part on the duty time of transmission, a threshold of radar signals to indicate detection of a radar signal at the access point on the DFS channel; and performing analysis of received wireless signals on the DFS channel at the access point to detect the radar signal using the adapted threshold of radar signals. As a result, implementations of the disclosure can Reduce the number of false radar detection, increase network usability and stability of the AP, improve detection of false versus real radar signals at the AP, and reduce cost associated with engineering time on false detection of radar signals.

FIG. 1 illustrates one example of a network configuration 100 in which dynamic radar detection threshold for stateful DFS of implementations of the disclosure might be implemented. FIG. 1 illustrates an example of a network configuration 100 implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106A-C. Switches 108 and wireless APs 106A-C provide network connectivity to various client devices 110A-J. Using a connection to a switch 108 or AP 106A-C, a client device 110A-J may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (TOT) devices, and the like.

Within the primary site 102, a switch 108 is included as one example of a point of access to the network established in primary site 102 for wired client devices 110I-J. Client devices 110I-J may connect to the switch 108 and through the switch 108, may be able to access other devices within the network configuration 100. The client devices 110I-J may also be able to access the network 120, through the switch 108. The client devices 110I-J may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110A-H. Each of APs 106A-C may be a combination of hardware, software, and/or firmware that is configured to provide wireless network connectivity to wireless client devices 110A-H. In the illustrated example, APs 106A-C can be managed and configured by the controller 104. APs 106A-C communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140A-D.

In various embodiments, the remote site 132 may be in direct communication with primary site 102, such that client devices 140a-d at the remote site 132 access the network resources at the primary site 102 as if the client devices 140a-d were located at the primary site 102. In such embodiments, the remote site 132 is managed by the controller 104 at the primary site 102, and the controller 104 provides the connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150A-B access the network 120. Such a remote site 142 may represent, for example, an individual employee's home or a temporary remote office. The remote site 142 may also be in communication with the primary site 102, such that the client devices 150A-B at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 132, 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160A-B. Content servers 160A-B may include various providers of multimedia downloadable and/or streaming content, including audio, video, graphical, and/or text content, or any combination thereof. Examples of content servers 160A-B include, for example, web servers, streaming radio and video providers, and cable and satellite television providers. The client devices 110A-J, 140A-D, 150A-B may request and access the multimedia content provided by the content servers 160A-B.

In implementations of the disclosure, APs 106A-C, 136, 146 may implement dynamic radar detection threshold for stateful DFS by dynamically adjusting a threshold level of (e.g., minimum number) of radar bursts and/or pulses (depending on long form or short form radar waveform) entailed for the classification of radar in the AP. Further description of dynamic radar detection threshold adjustment by APs 106A-C, 136, 146 is described with respect to FIGS. 2-6 below.

Figure 2:
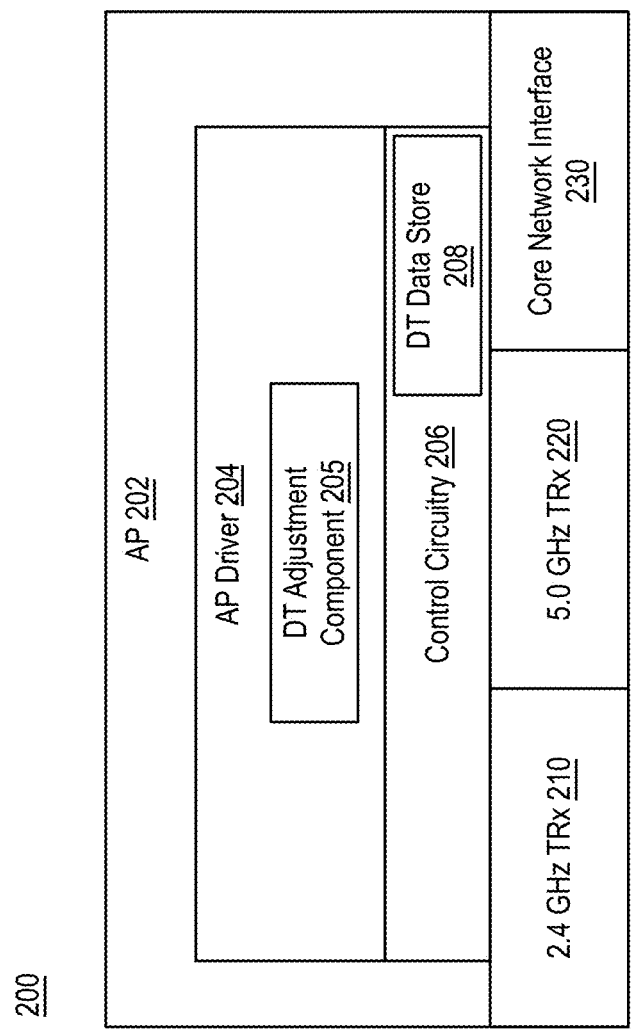
FIG. 2 illustrates a system architecture for dynamic radar detection threshold for stateful DFS according to some embodiments.

FIG. 2 illustrates a system architecture of an access point 200 implementing dynamic radar detection threshold for stateful DFS, according to some implementations. In one implementation, AP 200 may be an example embodiment of one of APs 106a-c, 136, 146 described with respect to FIG. 1. The quantity of devices and/or networks illustrated in FIGS. 1 and 2 is provided for explanatory purposes only. In practice, network configuration 100 may include additional devices and/or networks; fewer devices and/or networks; different devices and/or networks; or differently arranged devices and/or networks than illustrated in FIGS. 1 and 2. For example, while not shown, network configuration 100 may include devices that facilitate or enable communication between various components shown in network configuration 100, such as routers, modems, gateways, switches, hubs, etc.

As illustrated, AP 200 may include an AP driver 204, control circuitry 206, 2.4 GHz transceiver (TRx) 210, 5 GHz transceiver 220, and core network interface 230. Control circuitry 206 may include one or more processors, Application Specific Integrated Circuits (ASICs), and/or memories that execute one or more software or firmware programs, a combinational logic circuit, and/or other suitable software or hardware components. In some embodiments, the control circuitry may be implemented in, or functions associated with the control circuitry may be implemented by, one or more software or firmware modules. In some embodiments, the control circuitry may include logic, at least partially operable in hardware. The memory may include, for example, a computer-readable medium, which may be a non-transitory computer-readable medium. The computer-readable medium may store processor-executable instructions that, when executed by control circuitry 206, may control the implementation of certain aspects of the functionality described herein. Control circuitry 206 may generally control the operation of AP 200. Control circuitry 206 may operate to execute functionality of AP driver 204.

The 2.4 GHz transceiver 210 and the 5 GHz transceiver 220 may include radio frequency (RF) circuitry and/or antennas for communicating in the 2.4 GHz and 5 GHz unlicensed bands, respectively. The 5 GHz transceiver 220 may include circuitry for measuring and/or listening for the presence of devices associated with a radar system (e.g., listening for the presence of radar pulses).

Core network interface 230 may include circuitry to implement a physical interface with a network, such as network 120 described with respect to FIG. 1. In one embodiment, core network interface 230 may connect to network using a wired interface (e.g., an Ethernet cable, a fiber link, etc.). Alternatively, or additionally, core network interface 230 may provide a wireless interface to network, such as via a microwave link, a cellular radio link, or other wireless link.

In one implementation, the 5 GHz transceiver 220 may be controlled by control circuitry 206 to implement the dynamic radar detection threshold for stateful DFS in accordance with implementations of the disclosure. Control circuitry 206 may operate to execute functionality of AP driver 204 that implements a dynamic threshold (DT) adjustment component 205. The DT adjustment component 205 may implement a dynamic radar detection threshold for stateful DFS in accordance with implementations of the disclosure. In some implementations, the DT adjustment component 205 may also be referred to as dynamic threshold adaptation code.

In some embodiments, the DT adjustment component 205 dynamically adjusts (via control circuitry 206) a threshold that is used for detection of radar systems when the AP 200 is operating on a channel with DFS rules in place (referred to herein as a DFS channel). When a radar system is also operating on that same DFS channel, the radar can cause a series of RF bursts and/or pulses that the 5.0 GHz TRx 220 reports to the AP driver 204. The DT adjustment component 205 of AP driver 204 then identifies the radar based on known patterns of the radar systems. However, the 5.0 GHz TRx 220 is not able to listen at the same time as it is transmitting. As such, while the AP 200 is transmitting, the 5.0 GHz TRx 220 cannot see the RF bursts/pulses for the DFS detection process, and as such, cannot see all the RF bursts/pulses to qualify at 100% of the total radar. As a result, typical qualifications for passing a DFS radar test are a maximum transmit traffic load of 10%/30% over the air, and that the aggregated passing results should be around 80%. As such, passing the DFS radar test entails a fraction of the expected RF burst/pulse amount. For example, if a radar type has 23-29 pulses, the DFS detection process may accept 11 pulses or more as a radar hit. However, a static threshold of reduced RF bursts/pulses does not take into account the various modes and transmission levels an AP 200 may operate under, as discussed further below.

The modes of the AP 200 may include, but are not limited to, a CAC mode, an ISM mode, a ZDFS mode, or a ZTX mode. The CAC mode is a DFS function that monitors a channel to determine if a radar waveform above a DFS detection threshold is present. The ISM mode is a DFS function that monitors the operating channel for the presence of a radar waveform above a DFS detection threshold. The ZDFS mode refers to an additional radio chain (+1) that can be used for DFS radar detection. The ZTX mode refers to zero transmission occurring during an operating period, while still transmitting the 802.11 beacon frame.

As noted above, a static threshold of reduced RF bursts/pulses does not take into account the various modes and transmission levels that an AP 200 may operate under. For example, when the AP 200 is in CAC or ZDFS mode, the AP 200 should be able to see all the RF bursts/pulses, because during those modes the AP 200 is not transmitting. Even if the AP 200 is in the ISM mode, depending on the transmit load below the 10%/30% level, the AP 200 should be able to dynamically adjust the minimum number of RF pulses entailed.

In implementations of the disclosure, the DT adjustment component 205 can dynamically adjust a threshold level of (e.g., minimum number) of radar bursts and/or pulses (depending on long form or short form radar waveform) entailed for the classification of radar in the AP. Depending on a mode of the AP 200, the DT adjustment component 205 can estimate the duty of time of transmission of the AP and adapt the threshold in a dynamic fashion based on the estimated duty time of transmission.

In CAC and ZDFS modes of the AP 200, there is no transmission occurring on the AP 200. As such, all radar pulses/bursts are expected to be present. Thus, in implementations of the disclosure, a threshold configuration for detection of radar pulses/bursts can be adjusted higher by the DT adjustment component 205 via a dynamic threshold. In another example, transmitting beacons with no clients (e.g., when AP 200 is in ZTX mode) results in potentially receiving a smaller number of radar bursts and/or pulses than the full amount of transmitted radar pulses/bursts. Thus, the threshold configuration for detection of radar pulses/bursts can be adjusted higher by the DT adjustment component 205 via the dynamic threshold, but perhaps not as high as the CAC/ZDFS mode's associated dynamic thresholds. Heavy AP 200 usage (e.g., such as when the AP 200 is in ISM mode) may result in potentially receiving a small amount of radar pulses/bursts than the full amount of transmitted radar pulses/bursts. Thus, the threshold configuration for detection of radar pulses/bursts can be adjusted lower by the DT adjustment component 205 via the dynamic threshold.

The following description provides explanation of how the DT adjustment component 205 dynamically adjusts a threshold level of (e.g., minimum number) of radar bursts and/or pulses (depending on long form or short form radar waveform) entailed for the classification of radar in the AP 200. For ease of explanation, the following description refers to a short pulse (e.g., FCC Type 2) radar type. However, implementations of the disclosure may be applied to a variety of short pulse radar type waveforms and long pulse radar type waveforms. In one example, the short pulse radar type waveforms may include, but are not limited to, FCC Types 1-4 and the long pulse radar type waveforms may include, but are not limited to, FCC Type 5. However, implementations of the disclosure can apply to other regulatory radar types, including frequency hopping (e.g., FCC Type 6) and radar types of other geographic and regional jurisdictions and localities.

In implementations of the disclosure, to dynamically adjust the threshold level of radar bursts/pulses used for radar detection, the DT adjustment component 205 may utilize one or more tables loaded from a hardware abstraction layer (HAL) of the AP 202 in. In some implementations, the tables may be maintained in a DT data store 208 of the control circuitry 206 of the AP 200.

In one implementation, there may be a static separate table used for CAC/ZDFS modes, and a dynamic table used for the ZTX mode (and in some examples ISM mode). In some implementations, a single dynamic table may be used for all of the CAC/ZDFS/ZTX modes (and in some examples ISM mode as well).

The following are example static and/or dynamic tables that may be loaded by the DT adjustment component 205 for FCC Type 2 radar detection. Each radar type may have its own static and/or dynamic tables that may be maintained in DT data store 208 and used by DT adjustment component 205. Furthermore, DFS consists of short pulse radar waveform and also long pulse radar waveform. A radar burst consists of one or more radar pulses. In short pulse radar waveform, generally one burst of pulse is used for radar detection by the DFS process. However, the long pulse radar waveform is over 12 seconds, and the DFS detection process includes examining an additional threshold of radar burst over a period of time. As such, the following discussion refers to radar pulses. However, implementations of the disclosure may further apply to radar bursts as detected in the long pulse radar waveform detection scheme by DFS process.

```
Static: CAC/ZDFS
// FCC TYPE 2
{23, 5, 4347, 6666, 0, 4, 23, 0, 7, 22, 0, 3, 0, 2}, // 150us to
230us +/- 4us
Dynamic: CAC/ZDFS/ZTX
// FCC TYPE 2
{23, 5, 4347, 6666, 0, 4, 11, 21, 0, 7, 22, 0, 3, 0, 2}, // 150us to
230us +/- 4us
```

In the static table for CAC/ZDFS above, the first integer value of '23' indicates the number of pulses in a radar burst for an FCC Type 2 short pulse radar type. This integer value is also defined to as rp_numpulses. The second integer value of '23' (i.e., the 6th comma-delineated value in the static table) indicates the threshold for RF output to indicate a Type 2 radar match. This integer value is also defined to as rf_threshold or rf_min_threshold.

In the dynamic table for either ZTX alone or all of CAC/ZDFS/ZTX, the first integer value of '23' indicates the number of pulses in a radar burst for an FCC Type 2 short pulse radar type. This integer value is also defined to as rp_numpulses. The integer value of '11' (i.e., the 6th comma-delineated value in the static table) indicates the minimum threshold for RF output to indicate a Type 2 radar match This integer value is also defined to as rf_threshold or rf_min_threshold. The integer value of '21' (i.e., the 7th comma-delineated value in the static table) indicates the maximum threshold for RF output to indicate a Type 2 radar match. This integer value is also defined to as rf_max_threshold. Depending of the mode of operation (i.e., CAC, ZDFS, ZTX, ISM), different values in the dynamic table may be referenced. For example, in CAC/ZDFS mode, the rp_numpulses value may be referenced. In ZTX (and sometimes ISM mode), the rf_threshold and rf_max_threshold values may be referenced.

As noted above, when the AP 200 is operating in CAC mode or ZDFS mode, there is no transmission from the AP 200. As such, the dynamic threshold implemented by the DT adjustment component 205 should be around 100% of the total number of radar pulses.

When the AP 200 is operating in the ZTX model, the AP 200 continues to transmit 802.11 beacon frames. In this example, the dynamic threshold may vary based on the level of transmission to client stations. Thus, the dynamic threshold implemented by the DT adjustment component 205 may vary from around 90% to (X) % of the total number of radar pulses. The "X" in (X) % may be the percentage used to pass the DFS certification for the maximum Tx traffic load of 10%/30% over the air and the aggregated passing results around 80%.

As noted above with reference to the dynamic table, there may be a minimum DT vs maximum DT for each radar type. In one example, the minimum DT number for the FCC Type 2 radar may be 40% for a 10% Tx rate of the AP 200 and the maximum DT may be 90% for a 0% Tx of the AP 200. For such minimum and maximum DTs, a linear behavior can be modeled for the DT as the following function: DT=M*Y+B.

In the example, the transmission rate of the AP 200 may be indicated as a level of "Y"% Tx. If the "Y" % is greater than or equal than 10% Tx, then the DT=40% (Minimum DT), which is 11 pulses when the number of pulses in a radar burst for a FCC Type 2 short pulse radar type is defined as 23 (i.e., the rp_numpulses value in the loaded dynamic table). If the "Y" % is equal to 0% Tx, then the DT=90% (Maximum DT), which is 21 pulses when the number of pulses in a radar burst for a FCC Type 2 short pulse radar type is defined as 23 (i.e., the rp_numpulses value in the loaded dynamic table). Otherwise, in one implementation, when the "Y"% falls between 0% Tx and 10% Tx, a linear equation may be utilized.

In one implementation, the linear equation can be determined as follows using the 40% minimum DT and 90% maximum DTs:

$M=(Y2-Y1)/(X2-X1)==(40-90)/(10-0)=-50/10==-5;$

If $40=-5(10)+B \Rightarrow$ Then $B==90;$ $DT:=-5*Y+90;$

In one example that applies the above linear equation, if the AP 200 experiences a transmission rate of Y==5% Tx, then the linear equation in the example is −5*5+90. This yields a DT equal to 65% of 23 pulses, resulting in approximately 15 pulses as the dynamic threshold for an RF output that indicates an FCC Type 2 radar match.

Each radar type (e.g., FCC radar types 1-5) may have their own radar patterns. As such, each radar type would have their own minimum/maximum DT and separate linear behavior (DT=M*Y+B) configured in the DT adjustment component 205. In the above example a maximum DT of 90% is assume when in ZTX mode. However, in implementations of the disclosure, a separate process could be conducted to tune the maximum DT for the passing results of 80%.

In one example, the AP driver 204 may be modified to provide the functionality of the DT adjustment component 205. Example pseudocode for the DT adjustment component 205 is provided below. The example pseudocode for the DR adjustment component 205 applies for short pulse radar waveform detection. Implementations of the disclosure can also expand the pseudocode to apply to long pulse radar waveform detection (e.g., RF burst detection according to FCC Type 5 radar).

```
if (numpulses >= dfs_get_filter_threshold(dfs, rf, ext_chan_flag)) {
    found = 1;
    DFS_DPRINTK(dfs, ATH_DEBUG_DFS1, "ext_flag=%d
    MATCH filter=%u
numpulses=%u thresh=%u refdur=%d refpri=%d primargin=%d\n",
ext_chan_flag, rf-
>rf_pulseid, numpulses,rf->rf_threshold, refdur, refpri, primargin);
    dfs_print_delayline(dfs, &rf->rf_dl);
    dfs_print_filter(dfs, rf);
}
return found;
```

The "dfs_get_filter_threshold" function is conventionally implemented as detailed below:

```
int dfs_get_filter_threshold(struct ath_dfs *dfs, struct dfs_filter *rf,
int is_extchan_detect)
{
int ext_chan_busy=0;
int thresh, adjust_thresh=0;
thresh = rf->rf_threshold;
...
return thresh;
}
```

In implementations of the disclosure, the "thresh=rf→rf_threshold" portion of the "dfs_get_filter_threshold" function can be modified to implement the dynamic threshold adjustment of implementations of the disclosure. For example, the pseudocode "thresh=rf→rf_threshold" can be replaced with the below pseudocode portions depending on the mode of the AP 200.

For CAC/ZDFS modes:

```
thresh = (dfs->cac_valid == 1 || dfs->zdfs == 1)
    rf->rf_numpulses (Maximum
DT) : rf->rf_threshold(Minimum DT);
```

For ZTX mode:

```
thresh% = -5* %Tx + 90;
thresh = (1 + thresh%)* rf->rf_threshold (Minimum DT);
```

In implementations of the disclosure, the DT adjustment component 205 may determine the Tx transmission percentage based on data provided by the AP driver 204. In some implementations, a calculation can be made from the radar pulses. In one example, when all radar pulses are detected, the percentage Tx time may be determined The Tx rate can be calculated between each beacon interval at 100 ms. In some implementations, the Tx rate can be measured between radar pulse interval (pulse repetition interval (PRI)) for better tuning. In some implementations, the Tx rate may be calculated when the AP 200 is in ZTX (and in some cases ISM) mode, but not when the AP 200 is in CAC/ZDFS mode.

FIG. 3 is a flow chart to illustrate a process 300 for a dynamic radar detection threshold for stateful DFS in some embodiments. In one embodiment, the process 300 may be performed by DT adjustment component 205 described with respect to FIG. 2. In some embodiments, a process to provide for dynamic radar detection threshold for stateful DFS in an AP includes the following:

In some embodiments, the AP may estimate a duty time of transmission of wireless signals 310. The AP can provide Wi-Fi communication. In one embodiment, the wireless signals are communicated on a DFS channel of the access point.

The AP may then adapt, based at least in part on the duty time of transmission, a threshold of radar signals to indicate detection of a radar signal at the access point on the DFS channel 320. In one embodiment, the AP may perform analysis of received wireless signals on the DFS channel at the AP to detect the radar signal using the adapted threshold of radar signals 330. Lastly, in some embodiments, the AP stops transmission and selects a new channel on the AP in response to detecting the radar signal 340.

Figure 4:
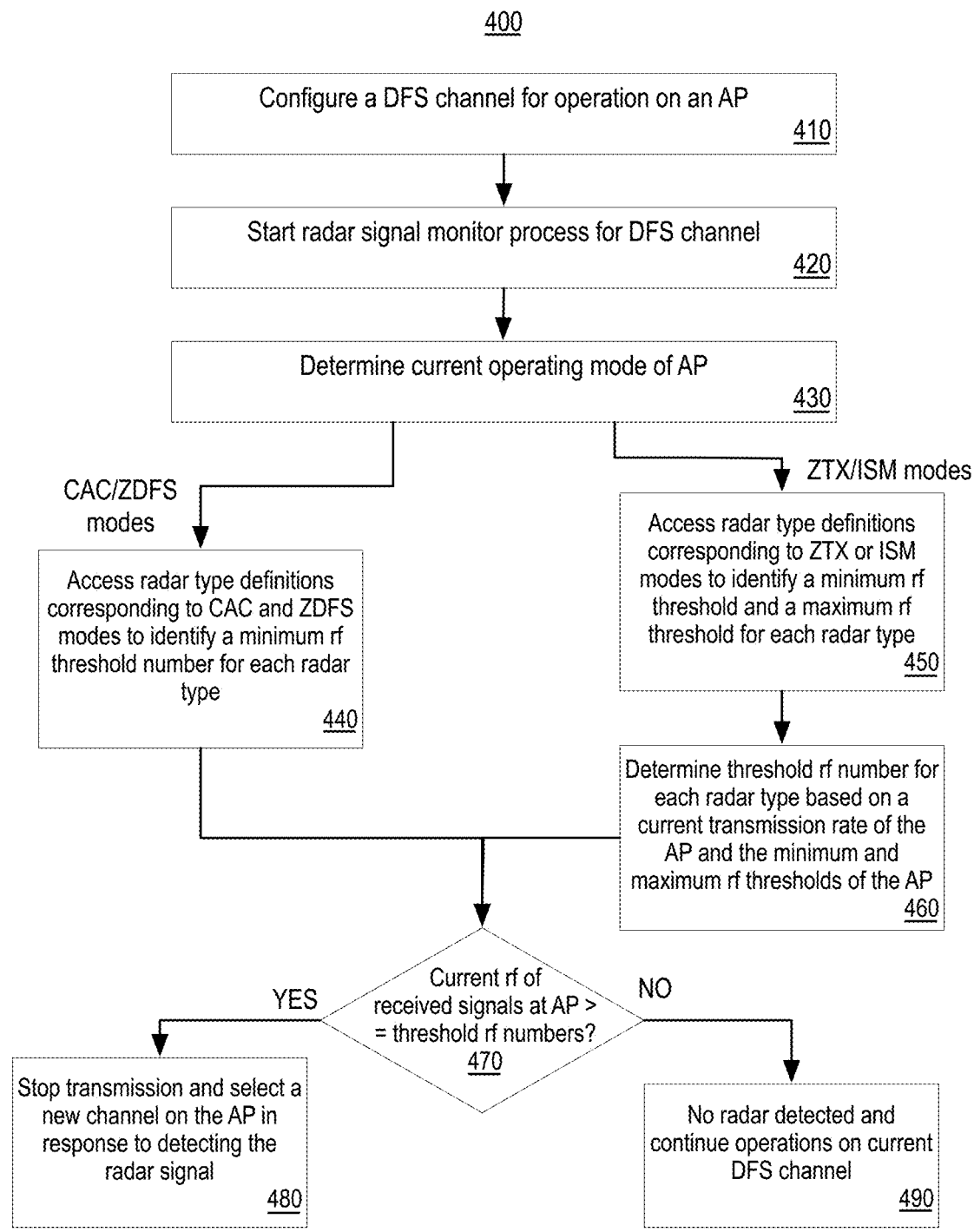
FIG. 4 illustrates operations for dynamic radar detection threshold for stateful DFS based on a mode and/or a transmission rate of an access point according to some embodiments.

FIG. 4 is a flow chart to illustrate a process 400 for a dynamic radar detection threshold for stateful DFS based on a mode and/or a transmission rate of an AP in some embodiments. In one embodiment, the process 400 may be performed by DT adjustment component 205 described with respect to FIG. 2. In some embodiments, a process to provide for dynamic radar detection threshold for stateful DFS based on a mode and/or a transmission rate of the AP includes the following:

In some embodiments, the AP may configure a DFS channel for operation on an AP 410. The AP may then start a radar signal monitor process for the DFS channel 420. The AP may determine a current operating mode of the AP 430. In one embodiment, the current operating mode may include, but are not limited to, CAC mode, ZDFS mode, ZTX mode, and/or ISM mode.

If the current operating mode is one of a CAC or ZDFS mode, then the AP may access radar type definitions corresponding to the CAC and ZDFS modes to identify a minimum rf threshold number for each radar type 440. In one embodiment, the minimum rf threshold number is configured in the accessed radar type definitions maintained by the AP.

If the current operating mode is one of a ZTX or ISM mode, then the AP may access radar type definitions corresponding to the ZTX and ISM modes to identify a minimum rf threshold number and a maximum rf threshold number for each radar type 450. In one embodiment, the AP then determines a threshold rf number for each radar type based on a current transmission rate of the AP and the minimum and maximum rf thresholds of the AP (as determined from the accessed radar type definitions for ZTX.ISM modes) 460.

The access point can then determine whether the current rf of received signals at the AP is greater than or equal to any of the threshold rf numbers 470. In some embodiments, this comparison of current rf of received signals to threshold rf numbers may be one of many features used to determine a radar signal match at the AP. If the current rf of the received signals is greater than or equal to the threshold rf numbers, then the AP stops transmission and selects a new channel on the AP in response to detecting the radar signal 480. If the current rf of the received signals is less than the threshold rf numbers, then no radar signal is detected at the AP and operations on the current DFS channel can continue at the AP 490.

Figure 5:
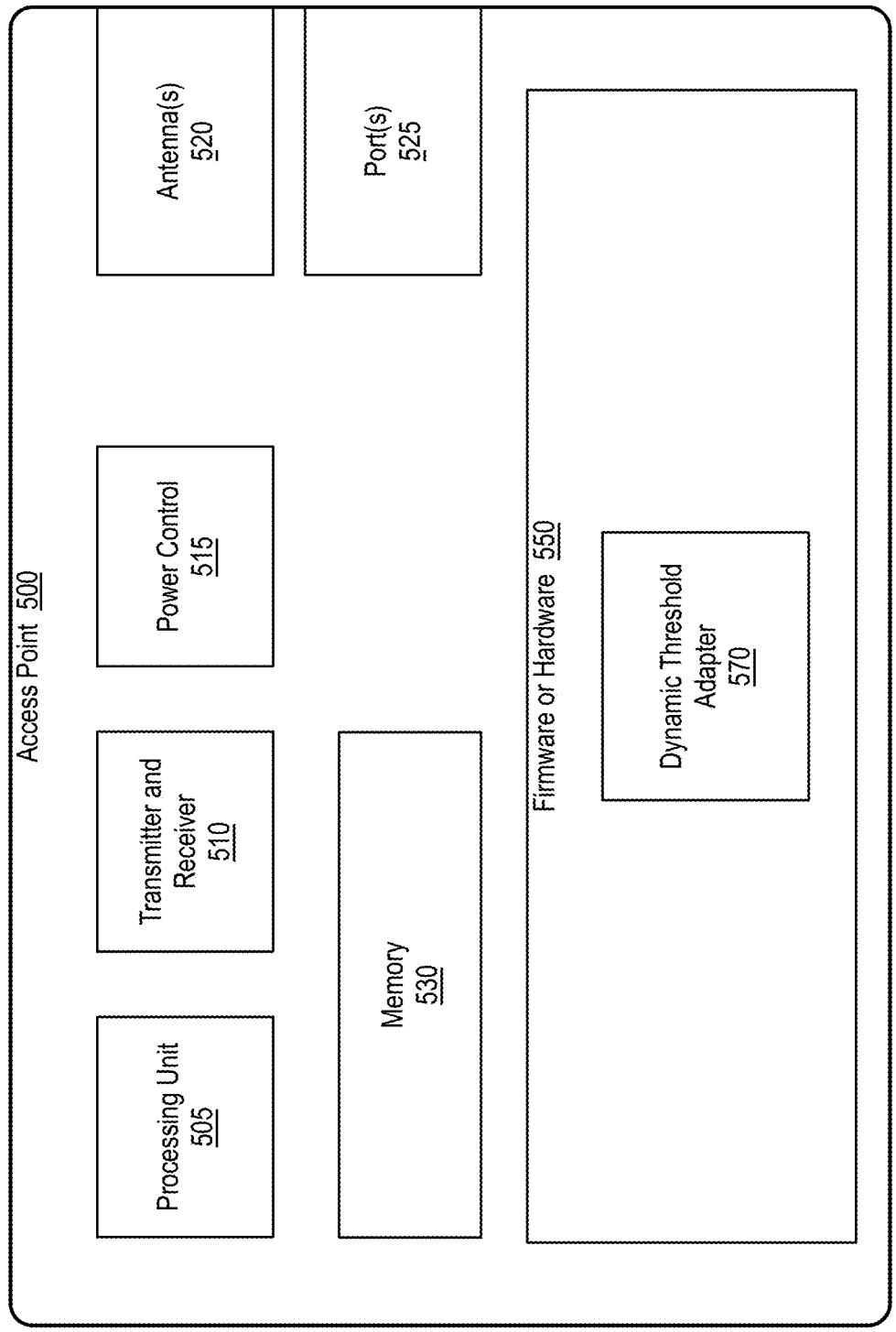
FIG. 5 is block diagram to illustrate an access point to provide Wi-Fi transmission or reception for dynamic radar detection threshold for stateful DFS according to some embodiments.

FIG. 5 is block diagram to illustrate an access point to provide Wi-Fi transmission or reception for a dynamic radar detection threshold for stateful DFS, according to some embodiments. An access point includes additional components and elements not illustrated in FIG. 5, which is simplified for sake of illustration. The illustrated Wi-Fi transmitter or receiver 500 may include an AP operating under one or more IEEE 802.11 standards, such as AP 202 illustrated in FIG. 2.

In some embodiments, the Wi-Fi transmitter or receiver 500 includes a processing unit 505, a transmitter and/or receiver 510, power control 515, and one or more antennas 520 for wireless signal communication. In some embodiments, the one or more antennas 520 include at least one of a pair of co-located polarized transmission antennas for a Wi-Fi transmitter or a uniform linear array of antennas for a Wi-Fi receiver. The Wi-Fi transmitter or receiver 500 may further include one or more ports 525 for network connections or other connections, and a memory 530 for storage of data, which may include volatile and nonvolatile memory (including flash memory and similar elements), registers, and other storage technologies.

In some embodiments, the Wi-Fi transmitter or receiver 500 may further includes firmware or hardware or both 550 including a dynamic threshold adapter 570 (may also be referred to herein as dynamic threshold adaptation code) to provide control dynamic radar detection threshold for stateful DFS, such as illustrated in FIGS. 1-4.

Figure 6:
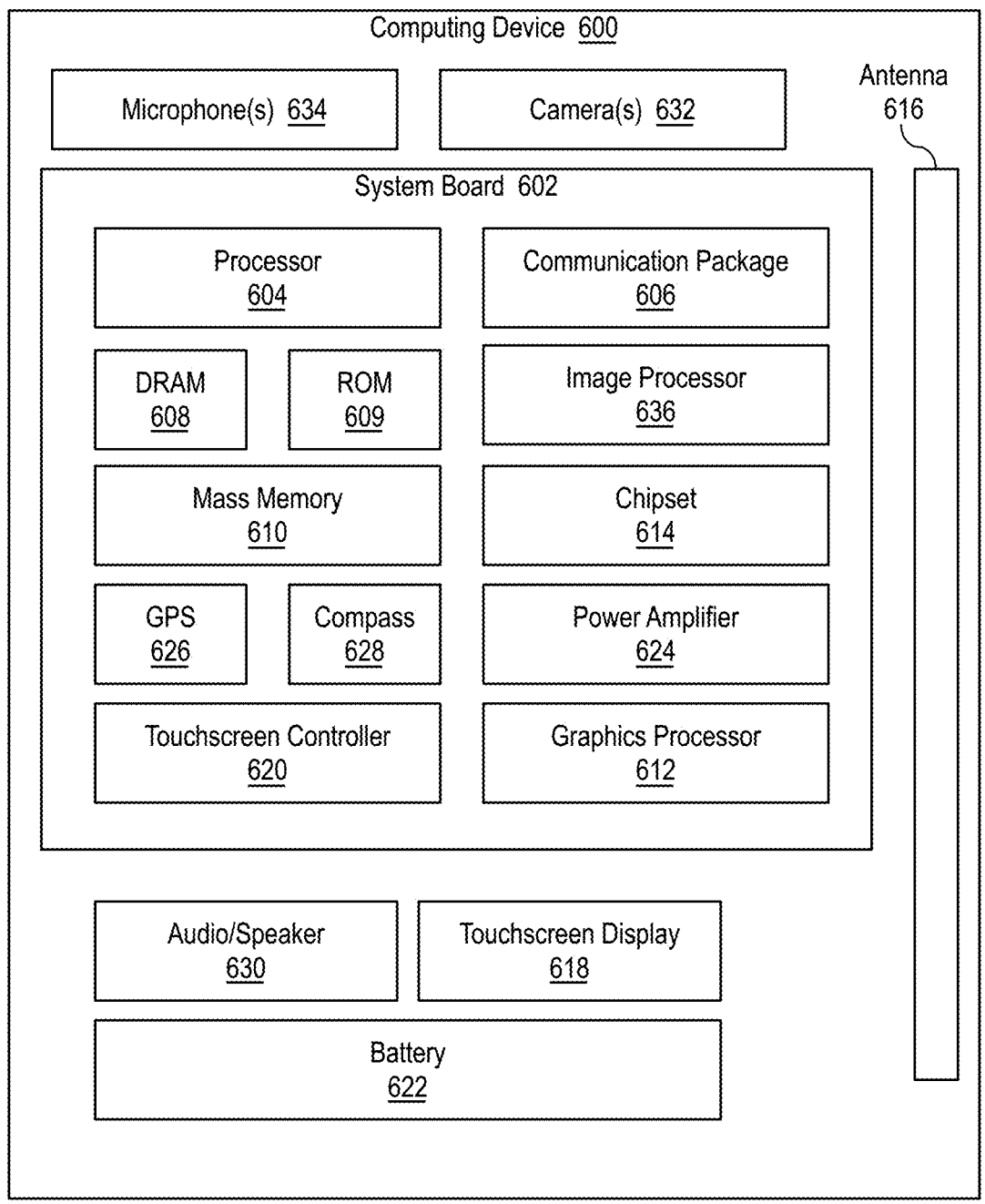
FIG. 6 illustrates components of a computing device according to some embodiments.

FIG. 6 illustrates a computing device 600 according to some embodiments. In some embodiments, the computing device 600 may include a device to communicate with an AP in network, such as AP 202 described with respect to FIG. 2. In some embodiments, computing device 600 may include an AP providing a dynamic radar detection threshold for stateful DFS, such as AP 202 described with respect to FIG. 2. Computing device 600 houses a system board 602 (which may also be referred to as a motherboard, main circuit board, or other terms). The board 602 may include a number of components, including but not limited to a processor 604 and at least one communication package or chip 606. The communication package 606 is coupled to one or more antennas 616. The processor 604 is physically and electrically coupled to the board 602.

Depending on its applications, computing device 600 may include other components that may or may not be physically and electrically coupled to the board 602. These other components include, but are not limited to, volatile memory (e.g., DRAM) 608, nonvolatile memory (e.g., ROM) 609, flash memory (not shown), a graphics processor 612, an image processor 636, a digital signal processor (not shown), a crypto processor (not shown), a chipset 614, an antenna 616, a display 618 such as a touchscreen display, a touchscreen controller 620, a battery 622, an audio codec (not shown), a video codec (not shown), a power amplifier 624, a global positioning system (GPS) device 626, a compass 628, an accelerometer (not shown), a gyroscope (not shown), a speaker or other audio element 630, one or more cameras 632, a microphone array 634, and a mass storage device (such as hard disk drive) 610, compact disk (CD) (not shown), digital versatile disk (DVD) (not shown), and so forth). These components may be connected to the system board 602, mounted to the system board, or combined with any of the other components.

The communication package 606 enables wireless and/or wired communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 606 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 600 may include a plurality of communication packages 606. For instance, a first communication package

606 may be dedicated to shorter range wireless communications such as Wi-Fi and Bluetooth and a second communication package 606 may be dedicated to longer range wireless communications such as GSM, EDGE, GPRS, CDMA, WiMAX, LTE, Ev-DO, and others.

In various implementations, the computing device 600 may be a laptop, a netbook, a notebook, an Ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 600 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium (or machine-readable storage medium), such as a non-transitory machine-readable medium, including instructions that, when performed by a machine, cause the machine to perform acts of the method, or of an apparatus or system for facilitating operations according to embodiments and examples described herein.

In some embodiments, an access point includes a processor; a transmitter and receiver for Wi-Fi communication; and firmware including dynamic threshold adaptation code to provide dynamic threshold adaptation for dynamic frequency selection (DFS), wherein the access point is to: estimate a duty time of transmission of wireless signals, the wireless signals being communicated on a Dynamic Frequency Selection (DFS) channel of the access point; adapt, based at least in part on the duty time of transmission, a threshold of radar signals to indicate detection of a radar signal at the access point on the DFS channel; and perform analysis of received wireless signals on the DFS channel at the access point to detect the radar signal using the adapted threshold of radar signals.

In some embodiments, one or more non-transitory computer-readable storage mediums have stored thereon executable computer program instructions that, when executed by one or more processors, cause the one or more processors to perform operations including estimating a duty time of transmission of wireless signals by an access point, the access point to provide Wi-Fi communication, the wireless signals being communicated on a Dynamic Frequency Selection (DFS) channel of the access point; adapting, based at least in part on the duty time of transmission, a threshold of radar signals to indicate detection of a radar signal at the access point on the DFS channel; and performing analysis of received wireless signals on the DFS channel at the access point to detect the radar signal using the adapted threshold of radar signals.

In some embodiments, method for a dynamic radar detection threshold for stateful dynamic frequency selection (DFS) includes estimating a duty time of transmission of wireless signals by an access point, the access point to provide Wi-Fi communication, the wireless signals being communicated on a Dynamic Frequency Selection (DFS) channel of the access point; adapting, based at least in part on the duty time of transmission, a threshold of radar signals to indicate detection of a radar signal at the access point on the DFS channel; and performing analysis of received wireless signals on the DFS channel at the access point to detect the radar signal using the adapted threshold of radar signals.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A non-transitory machine-readable storage medium encoded with instructions executable by a hardware processor of a computing component of a device, the non-transitory machine-readable storage medium comprising instructions to cause the hardware processor to:
    estimate a duty time of transmission of at least one of client-targeted and management-related wireless signals by an access point during non-channel availability check (CAC) mode of operation, the access point to provide Wi-Fi communication, the at least one of the client-targeted or management-related wireless signals being communicated on a Dynamic Frequency Selection (DFS) channel of the access point;
    adapt, based at least in part on the duty time of transmission, a threshold of radar signals to indicate detection of a radar signal at the access point on the DFS channel; and
    perform analysis of the at least one of the client-targeted or management-related wireless signals received on the DFS channel at the access point to detect the radar signal using the adapted threshold of radar signals.

2. The non-transitory machine-readable storage medium of claim 1, wherein the instructions further cause the hardware processor to:
    determine a current operating mode of the access point;
    access at least one radar type definition corresponding to the current operating mode of the access point; and
    identify, from the at least one radar type definition, the threshold of radar signals to indicate detection of the radar signal, wherein the threshold of radar signals differs according to an operating mode of the access point.

3. The non-transitory machine-readable storage medium of claim 2, wherein the threshold of radar signals differs among radar type definitions.

4. The non-transitory machine-readable storage medium of claim 2, wherein the current operating mode comprises at least one of a CAC mode, a zero wait dynamic frequency selection (ZDFS) mode, a zero transmit (ZTX) mode, or an in-service mode (ISM).

5. The non-transitory machine-readable storage medium of claim 4, wherein responsive to the current operating mode comprising the ZDFS mode or ISM, the threshold of radar signals is adapted based at least in part on the duty time of transmission.

6. The non-transitory machine-readable storage medium of claim 1, wherein the duty time of transmission is estimated between beacon intervals.

7. The non-transitory machine-readable storage medium of claim 1, wherein the duty time of transmission is estimated between pulse repetition intervals (PRIs).

8. The non-transitory machine-readable storage medium of claim 1, wherein the instructions further cause the hardware processor to:
    detect the radar signal using the adapted threshold of radar signals; and
    in response to detecting the radar signal, stop transmission on the DFS channel at the access point and select a new channel to configure on the access point.

9. The non-transitory machine-readable storage medium of claim 1, wherein the access point is a Wi-Fi access point comprising a plurality of transmitters and a plurality of receivers.

10. A method comprising:
    estimating a duty time of transmission of at least one of client-targeted and management-related wireless signals by an access point during non-channel availability check (CAC) mode of operation, the access point to provide Wi-Fi communication, the at least one of the client-targeted and management-related wireless signals being communicated on a Dynamic Frequency Selection (DFS) channel of the access point;
    adapting, based at least in part on the duty time of transmission, a threshold of radar signals to indicate detection of a radar signal at the access point on the DFS channel; and
    performing analysis of the at least one of client-targeted and management-related wireless signals received on the DFS channel at the access point to detect the radar signal using the adapted threshold of radar signals.

11. The method of claim 10, further comprising:
    determining a current operating mode of the access point;
    accessing at least one radar type definition corresponding to the current operating mode of the access point; and
    identifying, from the at least one radar type definition, the threshold of radar signals to indicate detection of the radar signal, wherein the threshold of radar signals differs according to an operating mode of the access point.

12. The method of claim 11, wherein the threshold of radar signals differs among radar type definitions.

13. The method of claim 11, wherein the current operating mode comprises at least one of a CAC mode, a zero wait dynamic frequency selection (ZDFS) mode, a zero transmit (ZTX) mode, or an in-service mode (ISM).

14. The method of claim 13, wherein responsive to the current operating mode comprising the ZDFS mode or ISM, the threshold of radar signals is adapted based at least in part on the duty time of transmission.

15. The method of claim 10, wherein the duty time of transmission is estimated between at least one of beacon intervals or pulse repetition intervals (PRIs).

16. The method of claim 10, further comprising:
detecting the radar signal using the adapted threshold of radar signals; and
in response to detecting the radar signal, stopping transmission on the DFS channel at the access point and select a new channel to configure on the access point.

17. An access point comprising:
a processor;
a transmitter and receiver for Wi-Fi communication; and
firmware including dynamic threshold adaptation code to provide dynamic threshold adaptation for dynamic frequency selection (DFS), wherein the access point is to:
estimate a duty time of transmission of at least one of client-targeted or management-related wireless signals during non-channel availability check (CAC) mode of operation, the at least one of the client-targeted or management-related wireless signals being communicated on a Dynamic Frequency Selection (DFS) channel of the access point;
adapt, based at least in part on the duty time of transmission, a threshold of radar signals to indicate detection of a radar signal at the access point on the DFS channel; and
perform analysis of the at least one of the client-targeted or management-related wireless signals received on the DFS channel at the access point to detect the radar signal using the adapted threshold of radar signals.

18. The access point of claim 17, wherein the access point is further to:
determine a current operating mode of the access point;
access at least one radar type definition corresponding to the current operating mode of the access point; and
identify, from the at least one radar type definition, the threshold of radar signals to indicate detection of the radar signal, wherein the threshold of radar signals differs according to an operating mode of the access point.

19. The access point of claim 18, wherein the current operating mode comprises at least one of a CAC mode, a zero wait dynamic frequency selection (ZDFS) mode, a zero transmit (ZTX) mode, or an in-service mode (ISM), and wherein the threshold of radar signals differs among radar type definitions.

20. The access point of claim 19, wherein responsive to the current operating mode comprising the ZDFS mode or ISM, the threshold of radar signals is adapted based at least in part on the duty time of transmission.

* * * * *